(12) United States Patent
Peltosaari (10) Patent No.: US 10,882,047 B2
(45) Date of Patent: Jan. 5, 2021

(54) SAMPLE VESSEL RACK, METHOD FOR LOCKING SAMPLE VESSELS IN A SAMPLE VESSEL RACK AND SAMPLE VESSEL RACK SYSTEM

(71) Applicant: THERMO FISHER SCIENTIFIC OY, Vantaa (FI)

(72) Inventor: Lauri Peltosaari, Espoo (FI)

(73) Assignee: Thermo Fisher Scientific OY, Vantaa (FI)

( * ) Notice: Subject to any disclaimer, the term of this patent is extended or adjusted under 35 U.S.C. 154(b) by 190 days.

(21) Appl. No.: 15/551,936

(22) PCT Filed: Feb. 19, 2016

(86) PCT No.: PCT/FI2016/050105
§ 371 (c)(1),
(2) Date: Aug. 18, 2017

(87) PCT Pub. No.: WO2016/132019
PCT Pub. Date: Aug. 25, 2016

(65) Prior Publication Data
US 2018/0036735 A1  Feb. 8, 2018

(30) Foreign Application Priority Data

Feb. 19, 2015  (FI) ...................................... 20155108

(51) Int. Cl.
*B01L 9/06* (2006.01)
*B01L 3/00* (2006.01)
(Continued)

(52) U.S. Cl.
CPC ............... *B01L 9/06* (2013.01); *B01L 3/5025* (2013.01); *G01N 30/24* (2013.01); *G01N 35/04* (2013.01);
(Continued)

(58) Field of Classification Search
None
See application file for complete search history.

(56) References Cited

U.S. PATENT DOCUMENTS

| 2,979,210 A | 4/1961 | Patterson |
| 4,484,907 A | 11/1984 | Sheeran, Jr. |
| (Continued) |

FOREIGN PATENT DOCUMENTS

| CN | 1997456 | 7/2007 |
| DE | 3003932 A1 | 8/1981 |
| (Continued) |

OTHER PUBLICATIONS

FI, Search Report of the Finnish Patent and Registration Office, Finnish Patent Application No. 20155108, 2 pages, dated Sep. 24, 2015.
(Continued)

*Primary Examiner* — Kathryn Wright (57) ABSTRACT

A sample vessel rack (1), which comprises a frame (2) with a plurality of openings (3) in the upper surface of the frame for sample vessels (9), and a locking plate member (5) movable in a plane parallel to the upper surface of the frame (2) of the rack from a releasing position to a locking position and back, wherein the removal of the sample vessels (9) from the rack is prevented when the locking plate member is in the locking position, the openings (3) of the upper surface of the frame (2) comprises slots (12) formed on their side, and in the locking position a part of the locking plate member (5) sets itself in the area of the slots. The invention also relates to such a method and a sample vessel rack system.

1 Claim, 5 Drawing Sheets

(51) Int. Cl.
*G01N 30/24* (2006.01)
*G01N 35/04* (2006.01)
(52) U.S. Cl.
CPC ..... *B01L 2200/025* (2013.01); *B01L 2200/14* (2013.01); *G01N 2035/0405* (2013.01)

(56) References Cited

U.S. PATENT DOCUMENTS

| | | | |
|---|---|---|---|
| 5,185,985 | A | 2/1993 | Vetter et al. |
| 6,132,684 | A | 10/2000 | Marino |
| 6,270,728 | B1 * | 8/2001 | Wijnschenk ......... B01L 3/5453 422/549 |
| 8,320,062 | B1 | 11/2012 | Persson |
| 2005/0276729 | A1 | 12/2005 | Helt |
| 2013/0209333 | A1 | 8/2013 | Nuotio et al. |

FOREIGN PATENT DOCUMENTS

| | | |
|---|---|---|
| EP | 1007213 B1 | 11/2003 |
| EP | 2253959 A1 | 11/2010 |
| ES | 2270672 B1 | 11/2007 |
| NL | 1003725 C2 | 2/1998 |
| WO | 2010/028294 A1 | 3/2010 |
| WO | 2012/058632 A1 | 5/2012 |

OTHER PUBLICATIONS

FI, Office Action of the Finnish Patent and Registration Office, Finnish Patent Application No. 20155108, 5 pages, dated Jan. 24, 2017.

PCT, International Search Report and the Written Opinion of the International Searching Authority (European Patent Office), International Application No. PCT/FI2016/050105, 11 pages, May 9, 2016.

CN, Search Report, Chinese Patent Application No. 201680011098. 8., 2 pages, Mar. 21, 2019.

* cited by examiner

SAMPLE VESSEL RACK, METHOD FOR LOCKING SAMPLE VESSELS IN A SAMPLE VESSEL RACK AND SAMPLE VESSEL RACK SYSTEM

CROSS-REFERENCE TO RELATED APPLICATIONS

This application is a National Stage filing of International Application No. PCT/FI2016/050105, filed Feb. 19, 2016, which claims priority of Finnish Patent Application No. 20155108, filed Feb. 19, 2015, which are incorporated herein by reference in their entireties.

FIELD OF TECHNOLOGY

The present invention relates to a sample vessel rack for storing and transferring one or more sample vessels and for feeding the sample vessels into a suitable analyzing instrument.

TECHNOLOGICAL BACKGROUND

Sample vessel or vial racks are used for storing and transferring a plurality of sample vessels as a single entity which significantly facilitates the handling of the sample vessels and the samples contained therein. The racks are also used for feeding samples in the sample vessels to an analyzing instrument, where the samples together with the sample vessels are usually removed from the rack in order to carry out the required analyzing process steps to the sample.

The sample vessel racks are generally square shaped, but other shapes are also used.

The sample vessels located in sample vessel racks typically comprise samples from different donors which are analyzed with suitable analyzer instrument. In the medical or clinical analysis of human based samples, such as blood, urine, feces etc., it is of utmost importance to prevent sample mix up which could lead to wrong analysis results being connected to the donor.

SUMMARY OF THE INVENTION

Both FDA (US Food and Drug Administration) and MDD/IVD standard ISO 13485 require that patient results generated by in vitro diagnostic (IVD) instruments must be traceable back to the original patient samples and to all analytically critical components of the analyzer systems including liquid consumables and disposables used in the analyzing processes.

In the context of the present invention a microbiology laboratory has several rooms or laboratories for different kinds of sample types. These rooms are also categorized based on biosafety levels (BSL) of the biological agents handled to BSL-1, BSL-2, BSL-3, and BSL-4. Many hazardous microbes, such as mycobacteria for example, are processed in BSL-3 level laboratories and nonhazardous microbes are processed in BSL-1 level laboratories. Samples from these laboratory rooms are transferred to a separate analyzing room for analysis, which analyzing room is equipped with suitable analyzer instruments and serve several different laboratory rooms.

Generally, the samples to be analyzed are prepared in a sample preparation station located at the BSL room or rooms. The sample preparation station comprises an instrument to facilitate movement of primary samples (e.g. bacterial colony) from original sample media (e.g. agar plate, blood culture bottle) to a sample vessel in an ergonomic manner which further reduces error.

As an example, a primary sample in an agar plate is taken to the sample preparation station and identification data of the primary sample which is stored in a barcode, radio frequency identification (RFID) tag or other indicia, is read to the sample preparation station with a suitable reader. Once confirmation of the data input is received, for example by a visual or audio signal, a specimen sample is taken from the primary sample with a sampling device, and the primary sample is returned to its storage. Next a sample vessel is taken, and its identification data is read to the sample preparation station with a suitable reader as was done with the primary sample. Then the sample in the sampling tool is inserted in the sample vessel, and the sample is transferred to the vessel for example by detaching the end of the sampling tool containing the sample inside the sample vessel by twisting the sample tool, for example. The remaining part of the sampling tool is discarded and the lid or cap of the sample vessel is closed. The sample vessel together with the sample is placed in an empty position of a sample vessel rack located in the sample preparation station in a proper orientation. The sample preparation station detects the location of the newly inserted sample vessel in the sample vessel rack and connects identification data obtained from the primary sample and the new sample vessel to the location of the sample vessel in the sample vessel rack.

When the sample vessel rack contains the required number of sample vessels, the sample vessel rack is removed from the sample vessel preparation station. In one example, the removal action also activates a locking means in the sample vessel rack. The locking means prevent the removal and swapping of any of the sample vessels located in the rack as well as the addition of sample vessels when locking is activated. The sample vessel rack is then inserted into an analyzing instrument, which insertion action optionally deactivates the locking means in the sample vessel rack, allowing removal and insertion of the sample vessels from the sample vessel rack for analysis operations.

The obtained analysis results are connected to the identification data of the sample from the sample preparation station, so that each analysis result can be tracked to a single sample.

The present invention provides a sample vessel rack, a method for locking sample vessels in a sample vessel rack and a sample vessel rack system for a plurality of sample vessels to be used in the above described process, where the sample vessels located in the sample vessel rack can be locked in their locations, so that the placement of the sample vessels in the rack cannot be changed during transfer and storing of the sample vessels in the rack. This improves the safety of the sample donors, since the possibility of a sample mix up is significantly reduced.

The sample vessel rack of the invention comprises a frame with a plurality of openings in the upper surface of the frame for sample vessels, and a locking plate member movable in a plane parallel to the upper surface of the frame of the rack from a releasing position to a locking position and back, wherein the removal of the sample vessels from the rack, and preferably also insertion of the sample vessel into the rack, is prevented when the locking plate member is in the locking position. Further, the openings of the uppers surface of the frame comprise slots formed on their side, and in the locking position a part of the locking plate member sets itself in the area of the slots.

In an embodiment of the sample vessel rack of the invention the locking plate member comprises a plurality of openings corresponding to the openings of the upper surface of the frame of the sample vessel rack.

In an embodiment of the sample vessel rack of the invention the frame of the sample vessel rack comprises a second surface below the upper surface, the second surface being parallel with the upper surface and having a plurality of openings for sample vessels, the location of the openings substantially corresponding to and being aligned with openings in the upper surface of the frame, and the locking plate member is located between the said upper and second surfaces.

The openings of the locking plate member are preferably larger than the opening of the upper surface and the second surface of the frame of the rack.

In an embodiment of the sample vessel rack of the invention the frame of the rack comprises side surfaces and an opening in at least one of the side surfaces for operating the locking plate member.

In an embodiment of the sample vessel rack of the invention the locking plate member is moved to a releasing position by inserting the sample vessel rack into a rack preparation apparatus or an analyzer instrument, and the locking plate member is moved to a locking position by removing the sample vessel rack from a rack preparation apparatus or an analyzer instrument. This may be obtained with a suitable protrusion located in the rack preparation apparatus and/or in the analyzer instrument, which protrusion sets itself inside the area of the sample vessel rack through a corresponding opening during inserting of the sample vessel rack and thus moves or forces the locking plate member to the releasing position during the inserting process. And similarly, when the sample vessel rack is removed from these devices, the locking plate member may be forced back at the locking position once the protrusion removes itself from the area of the sample vessel rack during the removal of the rack by a suitable spring member, which spring member is part of the sample vessel rack, preferably part of the locking plate member.

In an embodiment of the sample vessel rack of the invention the sample vessel rack has a substantially triangular form.

In an embodiment of the sample vessel rack of the invention the locking plate member comprises a spring member for keeping the locking plate member in the locking position with a spring force exerted by the spring member.

In an embodiment of the sample vessel rack of the invention the openings of the locking plate member are aligned with the openings of the upper surface and the second surface of the frame of the rack in the releasing position, and at least partially unaligned in the locking position. This alignment takes place in a direction perpendicular in relation to the upper surface of the frame of the rack.

In an embodiment of the sample vessel rack of the invention also the openings of the second surface of the frame, and the openings of the locking plate member comprises slots formed on the sides of the openings. The slots in the openings of the locking plate member are preferably larger than the slots in the openings of the upper and second surface of the frame of the rack. In this embodiment the area of the slots of the openings of the upper and second surface of the frame of the rack are at least partially covered by the locking plate member when the locking plate member is in the locking position.

The present invention also provides a method for locking sample vessels in a sample vessel rack, in which method at least one sample vessel is inserted in the sample vessel rack comprising an upper surface with a plurality of openings for sample vessels, wherein the at least one sample vessel is locked at its place in the rack by moving a locking plate member in a plane parallel to the upper surface of the sample vessel rack. Further, the openings of the upper surface of the frame comprise slots formed on their side, and the locking is achieved by setting a part of the locking plate member in the area of the slots.

In an embodiment of the method of the invention the locking plate member is moved to a releasing position by placing the sample vessel rack in a rack preparation apparatus or in an analyzer instrument, and the locking plate member is moved to a locking position by removing the sample vessel rack from a rack preparation apparatus or from an analyzer instrument.

The present invention also provides a sample vessel rack system, which system comprises a sample vessel rack of the invention with a plurality of sample vessel locations with slots and at least one sample vessel located in the said sample vessel locations, wherein the at least one sample vessel located in the sample vessel locations is locked in its location in the sample vessel rack by moving a locking plate member in a plane parallel with a top surface of the sample vessel rack so that a part of the locking plate member is set in the area of the slot and on top of a protrusion extending from the outer surface of the said at least one sample vessel.

In an embodiment of the sample vessel rack system of the invention the locking plate member in its locking position also prevents insertion of a sample vessel into the sample vessel rack.

The features defining a sample vessel rack of the invention are more precisely presented in claim 1, the features defining a method of the invention are more precisely presented in claim 10, and the features defining a sample vessel rack system of the invention are more precisely presented in claim 12. Dependent claims present advantageous features and embodiments of the invention.

DRAWINGS

An exemplifying embodiment and its advantages are explained in greater detail below in the sense of an example and with reference to the accompanying figures, where.

DETAILED DESCRIPTION OF THE EMBODIMENT

In the figures is shown an embodiment of a sample vessel rack 1 or the invention, which comprises a frame part 2 with an upper surface, into which top surface is formed a plurality of openings 3 for insertion of sample vessels.

Figure 1A:
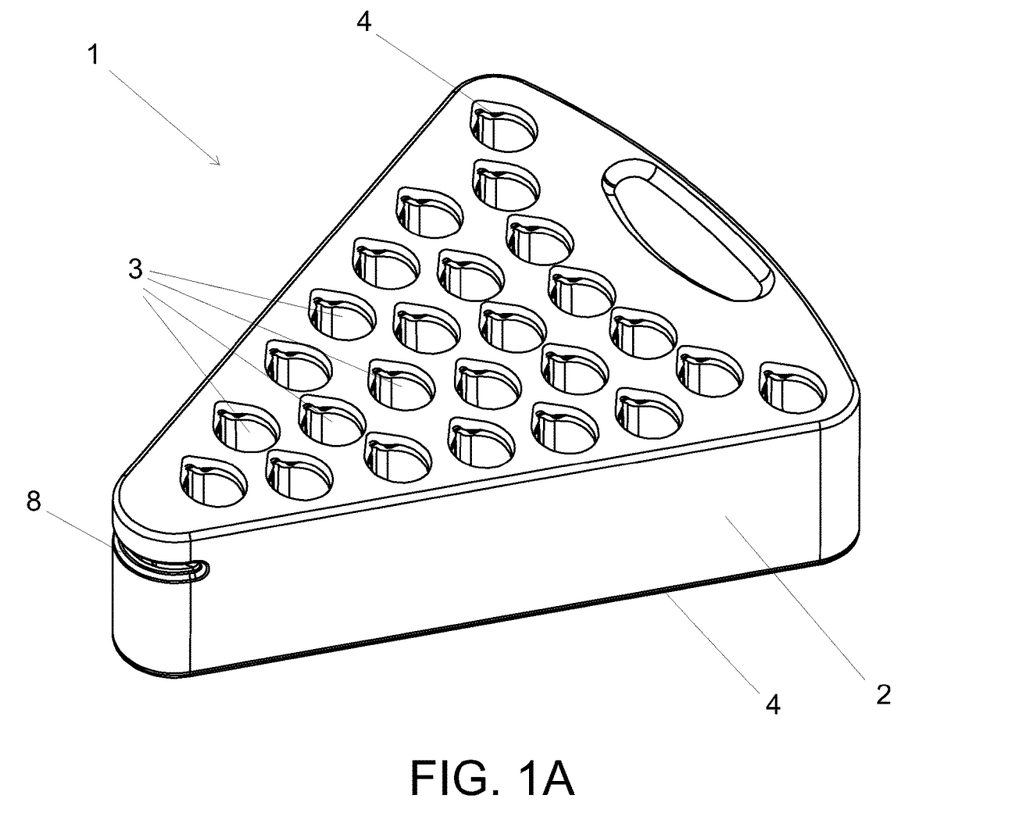
FIG. 1A shows an embodiment of a sample vessel rack of the invention as a perspective view.
Figure 1B:
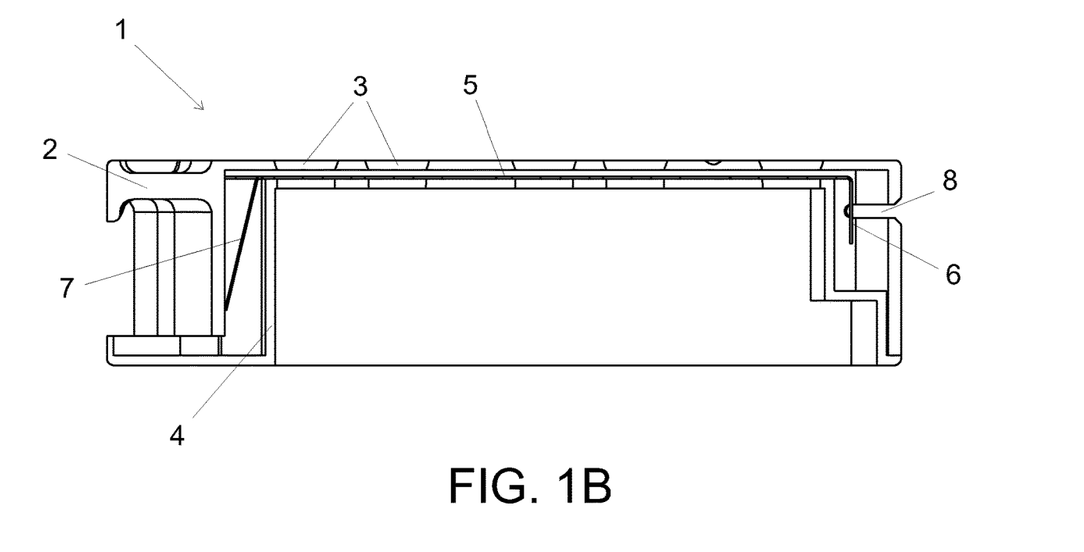
FIG. 1B shows a cross-sectional view of the embodiment of FIG. 1A
Figure 1C:
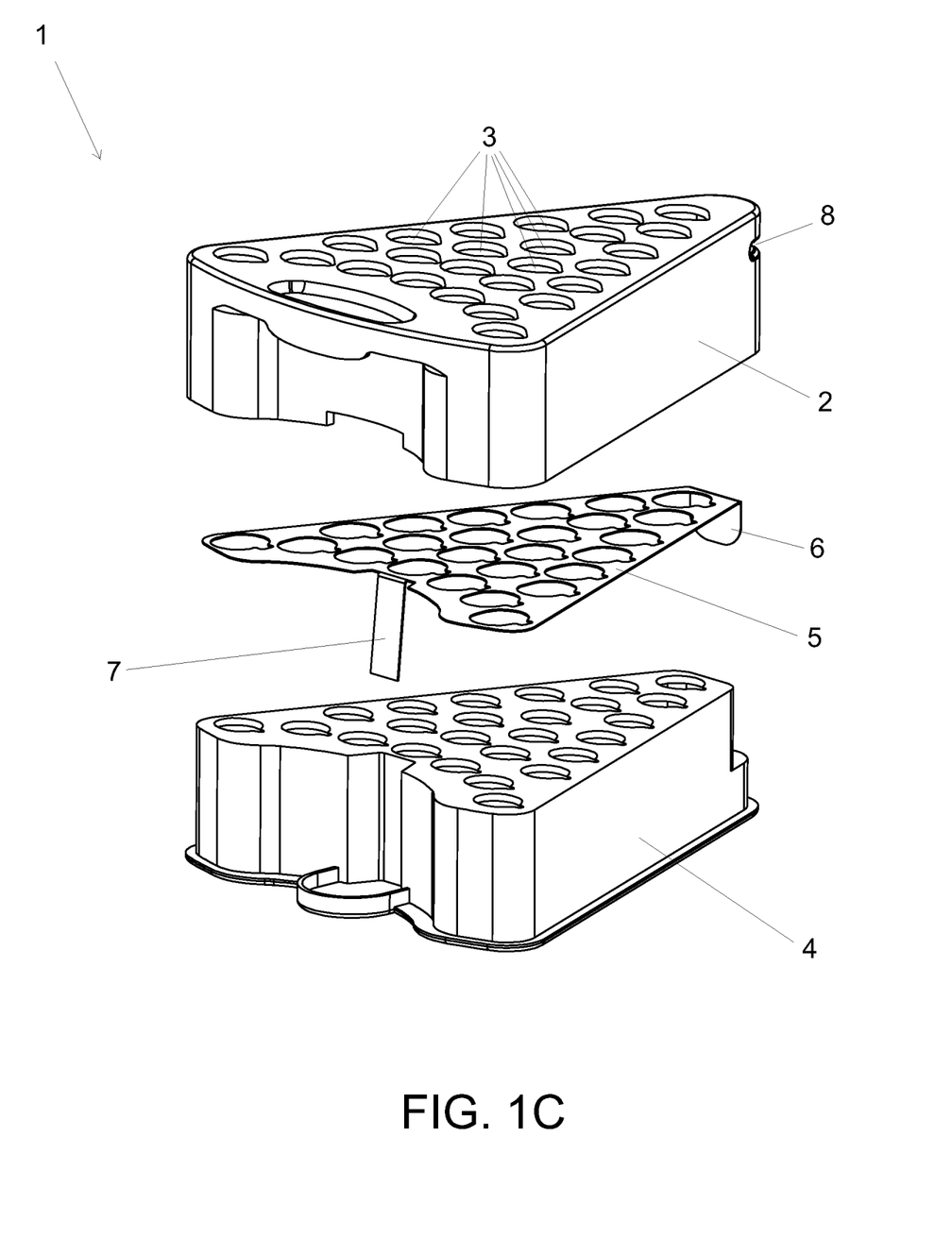
FIG. 1C shows an exploded view of the embodiment of FIG. 1A, FIGS. 2A and 2B show a partially cross-sectional view of the embodiment of FIG. 1A with a sample vessel.

As can be best seen from FIGS. 1B and 1C, inside the frame part 2 is located an inner frame part 4, which also has an upper surface formed with a plurality of openings, which openings have locations corresponding to and aligning with the locations of the openings 3 of the frame part 2. Thus, when the inner frame part 4 is located inside the frame part 2, the openings of both of the frame parts align in order to allow insertion of sample vessels 9 partially through these aligned openings so that a support surface 11 located at the upper portion of the sample vessel 9 sets against the upper surface of the frame part 2.

Between the upper surfaces of the frame part 2 and the inner frame part 4 is located a locking plate member 5. At one end of the locking plate member 5 is a downwards extending operating tab 6, and at the opposite end of the locking plate member is a downwards extending spring tab 7. By pushing the operating tab 6 via an opening in form of a narrow slit 8 formed on the side or end surface of the frame part 4, the locking plate member 5 is moved in a plane parallel with the upper surfaces of the frame part 2 and the inner frame part 4. In this embodiment this is the releasing position. Once the operating tab 6 is released, the locking plate member 5 is returned to its original position by the spring force exerted by the spring tab 7. In this embodiment the original position of the locking plate member 5 is the locking position.

The spring force exerted by the spring tab 7 automatically keeps the sample vessel rack 1 in a locking position. It is preferable that the operating tab 6 is pushed, and thus the locking plate member 5 is moved into the releasing position, only when the sample vessel rack 1 is either placed into a rack preparation apparatus or into an analyzer instrument. Due to this the slit 8 is formed very narrow, so that it is not easy to push the operating tab 6 and move the locking plate member 5 to the releasing position unintentionally. Further, rack preparation apparatuses and analyzer instruments are equipped with suitable protruding members, which set themselves into the narrow slit 8 and push the operating tab 6 and move the locking plate member 5 to the releasing position during the insertion of the sample vessel rack 1 into them.

Figure 2A:
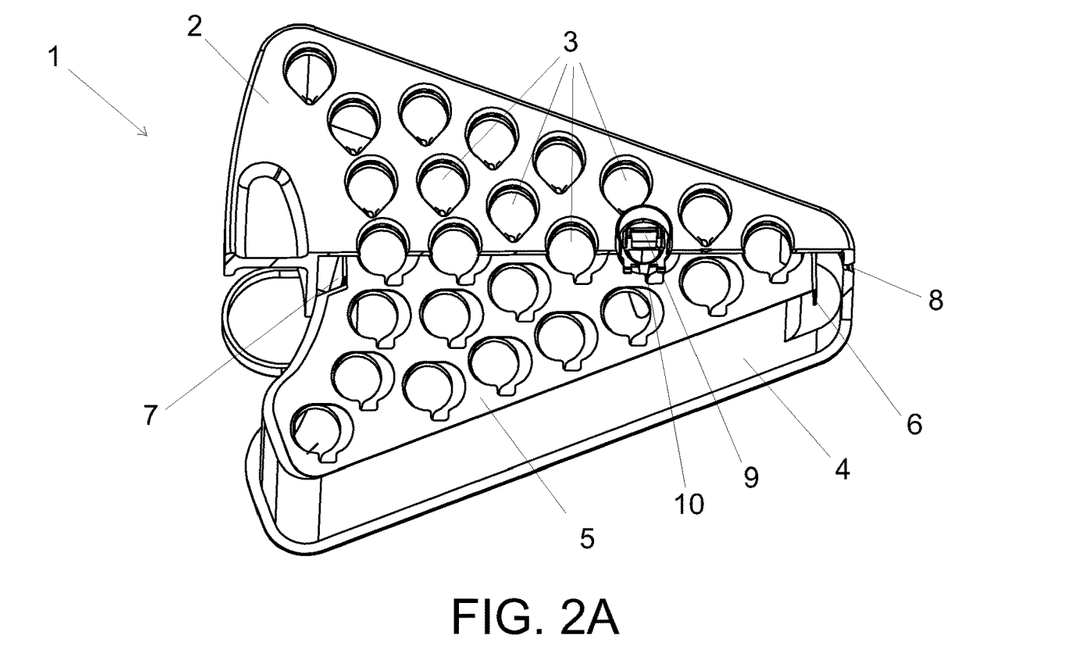
Figure 2B:
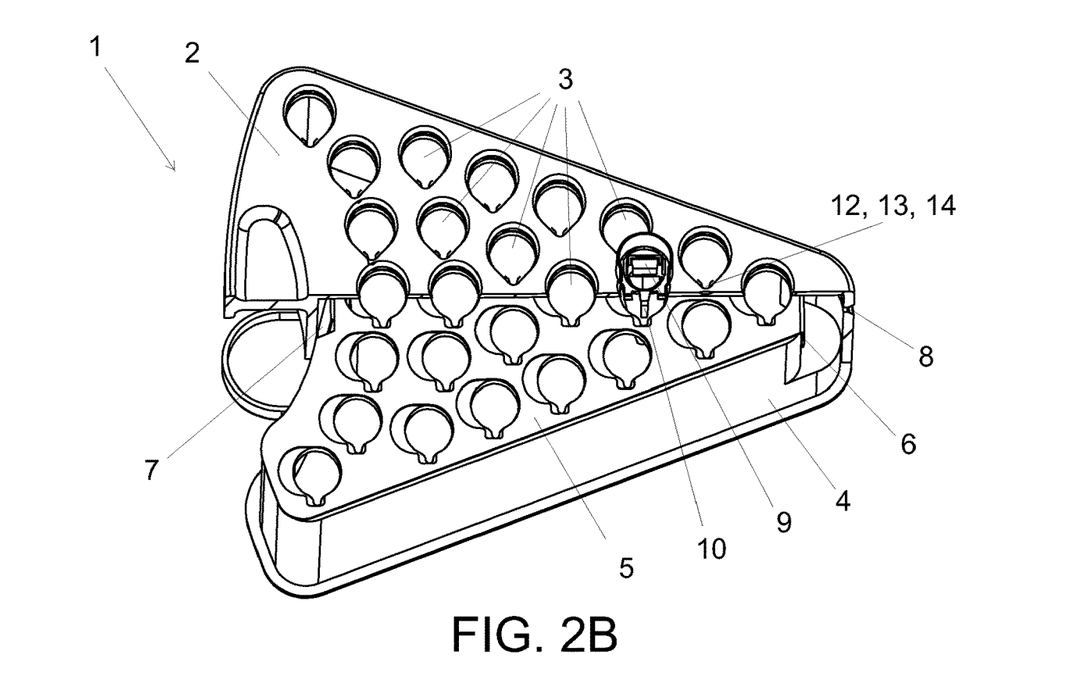
Figure 3A:
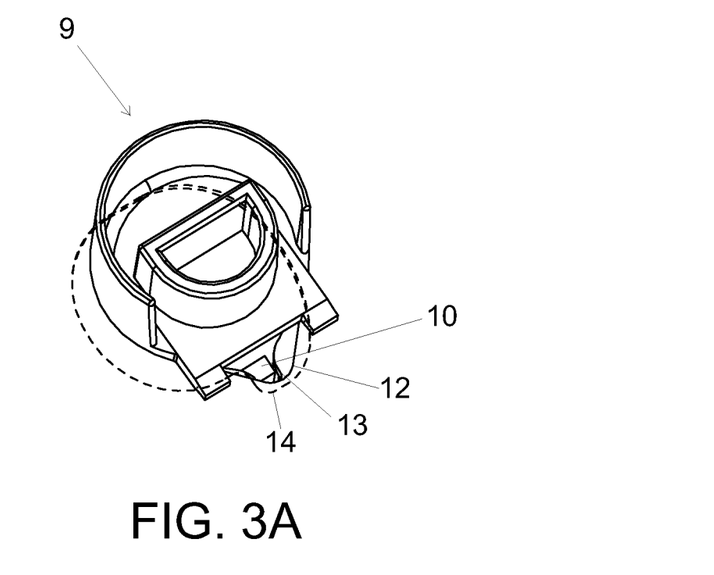
FIGS. 3A and 3B show enlargement of a sample vessel located in a sample vessel rack of the invention both in a releasing and in a locking position.
Figure 3B:
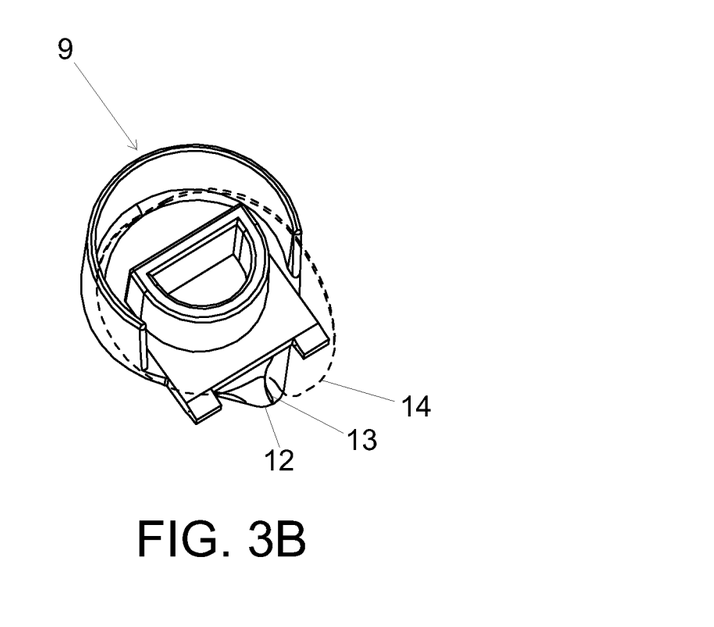

In FIGS. 2A and 2B is shown the sample vessel rack 1 of the invention together with a sample vessel 9. In these figures part of the frame part 2 is cut away to better show the locking mechanism. FIG. 2A shows the sample vessel rack 1 in a locking position and FIG. 2B shows the sample vessel rack in a releasing position. FIGS. 3A and 3B shows enlargement of the sample vessel 9 located in a sample vessel rack, where in FIG. 3A the locking plate member is in a locking position and in FIG. 3B the locking plate member is in a releasing position. In FIGS. 3A and 3B the opening of the locking plate member has a different shape than in the embodiment of other figures.

As can be seen from the FIGS. 2A and 2B, there is an additional slot or notch 12, 13 and 14 formed in the side surface of each of the sample vessel openings 3 of the frame part 2, the inner frame part 4 and the locking plate member 5. These slots or notches 12, 13 and 14 project away from the opening and operate together with a protrusion 10 formed on the outer surface of the sample vessel 9, so that the sample vessel can be inserted into the sample vessel rack 1 only in one orientation. The required proper orientation of the sample vessel 9 is further enhanced with an oval shape of the openings 3 and corresponding oval cross-section of the outer surface of the sample vessel in the part or portion inserted in the opening.

The protrusion 10 also cooperates with the locking plate member 5 in the locking position (FIG. 2A and 3B) of the sample vessel rack in order to lock the sample vessel 9 at its location, when part of the locking plate member 5 is moved on top of the protrusion.

In relation to the embodiment of the present invention shown in figures and discussed above, it is to be noted that the part of the locking plate member 5 which sets itself in the area of the slot or notch, preferably acts on all of the openings in the frame part 2 and the inner frame part 4 when in locking position. Thereby all of the sample vessels 9 located in the sample vessel rack are simultaneously locked at their places and no additional sample vessels can be inserted in the sample vessel rack 1 either since the locking plate member 5 prevents the protrusion 10 of the sample vessels to pass through the slots or notches.

According to one embodiment of the invention the slot 14 of the locking member 5 is larger than the slots 12 and 13 of the frame part 2 and the inner part 4.

According to another embodiment the slot 12 of the frame part 2 is larger than the slot 13 of the inner part. The sizes and shapes of the slot 12, 13 and 14 may also differ. According to an embodiment the slot 14 of the opening 3 of the locking plate member 5 is larger than the slot 12 of the opening 3 of the frame part 2. According to another embodiment the slot 12 of the frame part 2 is larger than the slot 13 of the inner part 4. These differences may be used to add tolerance on the insertion of the sample vessel 9 to the sample vessel rack 1.

Figure 4:
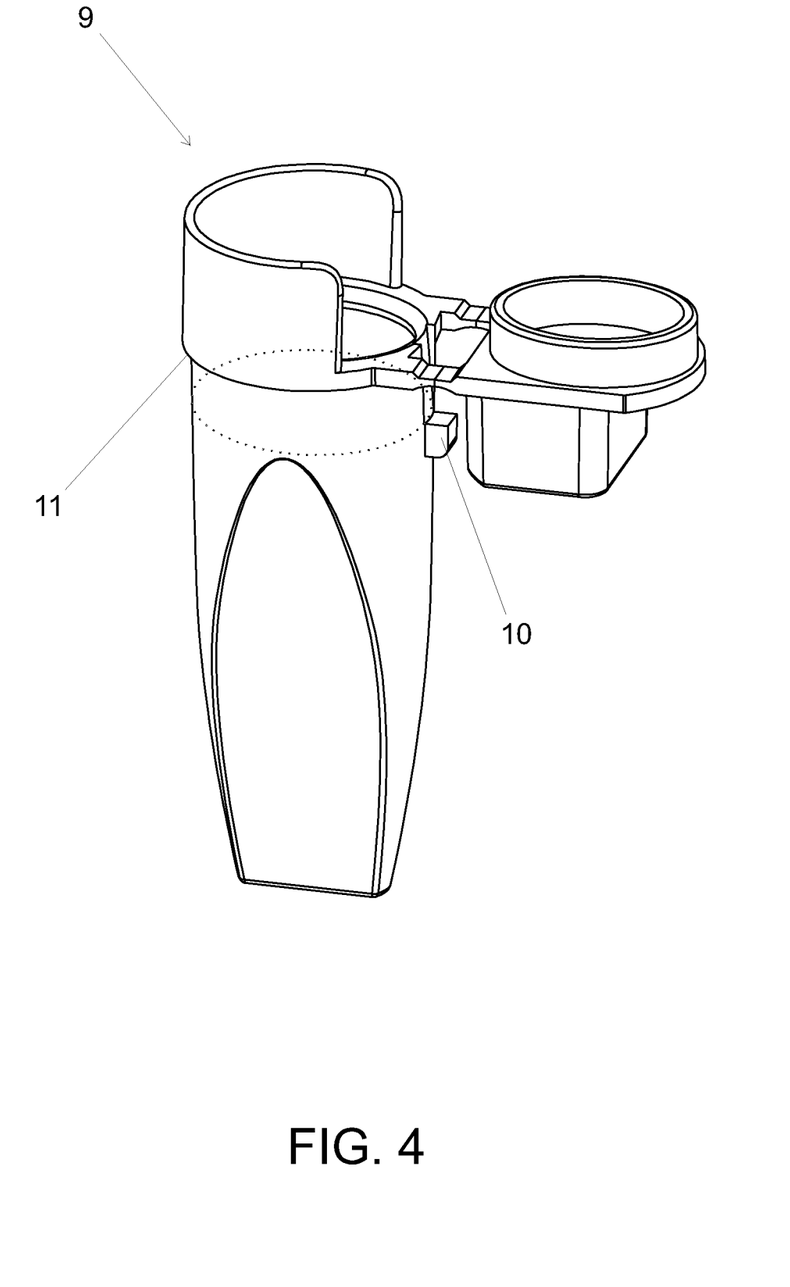
FIG. 4 shows a sample vessel for a sample vessel rack of the invention.

FIG. 4 shows in greater detail a sample vessel 9 suitable to be used with the sample vessel rack 1 of the invention. The sample vessel 9 is required to have a protrusion 10 on its outer surface for allowing the sample vessel to be locked in the sample vessel rack, and a support surface 11 for setting against the upper surface of the frame 2 of the sample vessel rack.

The specific exemplifying embodiment of the invention shown in figures and discussed above should not be construed as limiting. A person skilled in the art can amend and modify the embodiment in many evident ways within the scope of the attached claims. Thus the invention is not limited merely to the embodiment described above.

The invention claimed is:

1. A sample vessel rack assembly comprising a frame, a locking plate and an inner frame, with each having a triangular prismatic shape,
    the frame having an upper surface, the frame upper surface, and three sides that extend away from the frame upper surface, with a slit occurring at an apex not at the frame upper surface and extending on either side of the apex of the frame,
    the locking plate having an upper surface, the locking plate upper surface, an operating tab and a spring tab, with both the operating tab and the spring tab extending away from the locking plate upper surface, the operating tab being at an apex of the locking plate and opposite of the spring tab and such that the operating tab aligns with the slit in the frame, and
    the inner frame having an upper surface, an inner frame upper surface, and three sides extending away from the inner frame upper surface, with the inner frame upper surface and three sides of the inner frame being of such dimensions as to fit within the confines of the volume of the frame, the locking plate being of such dimensions as to fit within the confines of the volume of the frame, with the locking plate being between the frame and the inner frame upper surface, with the three sides of the frame and the three sides of the inner frame extending in the same direction and the frame, locking plate and inner frame having axially aligned holes to accommodate sample vessels, wherein the locking plate is movable in a plane parallel to the upper surface of the frame of the rack from a releasing position to a locking position and back, wherein the removal of the sample vessels from the rack is prevented when the locking plate is in the locking position.

* * * * *